(12) United States Patent
DeWalt et al.

(10) Patent No.: US 11,951,972 B2
(45) Date of Patent: Apr. 9, 2024

(54) METHOD FOR SHAPING MOTOR TORQUE PROFILE DURING A LAUNCH ENGINE START

(71) Applicant: Ford Global Technologies, LLC, Dearborn, MI (US)

(72) Inventors: Joshua Nicholas DeWalt, Canton, MI (US); Fazal Urrahman Syed, Canton, MI (US); Sassan Farahmand, Canton, MI (US); Minku Lee, Canton, MI (US); Justin Panhans, Detroit, MI (US); Andrew Burt, Royal Oak, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/656,718

(22) Filed: Mar. 28, 2022

(65) Prior Publication Data

US 2023/0303061 A1     Sep. 28, 2023

(51) Int. Cl.
| | |
|---|---|
| *B60W 20/19* | (2016.01) |
| *B60W 10/06* | (2006.01) |
| *B60W 10/08* | (2006.01) |
| *B60W 30/18* | (2012.01) |
| *B60W 40/09* | (2012.01) |
| *B60W 50/00* | (2006.01) |
| *F02D 41/06* | (2006.01) |
| *F02D 41/10* | (2006.01) |

(52) U.S. Cl.
CPC ............ *B60W 20/19* (2016.01); *B60W 10/06* (2013.01); *B60W 10/08* (2013.01); *B60W 30/18027* (2013.01); *B60W 40/09* (2013.01); *B60W 50/0097* (2013.01); *F02D 41/062* (2013.01); *F02D 41/10* (2013.01); *B60W 2540/10* (2013.01); *F02D 2200/602* (2013.01)

(58) Field of Classification Search
CPC ...... B60W 20/19; B60W 10/06; B60W 10/08; B60W 30/18027; B60W 40/09; B60W 50/0097; B60W 2540/10; F02D 41/062; F02D 41/10; F02D 2200/602
See application file for complete search history.

(56) References Cited

U.S. PATENT DOCUMENTS

| | | | |
|---|---|---|---|
| 10,065,626 B2 * | 9/2018 | Wang | B60W 10/08 |
| 10,495,009 B2 * | 12/2019 | Park | B60W 20/40 |

(Continued)

*Primary Examiner* — Carl C Staubach
(74) *Attorney, Agent, or Firm* — David Kelley; McCoy Russell LLP

(57) ABSTRACT

Methods and a system are provided for shaping a torque profile for a motor of a hybrid vehicle. In one example, the method includes during a vehicle launch, an off condition of an engine, and upon receiving an engine start request, predicting a time of engine engagement, predicting a driver requested torque at the engine engagement; and reducing the driver requested torque until the predicted time of engine engagement based on the predicted driver requested torque at the engine engagement. The predicting of at least one of the time of engine engagement and the driver requested torque at the engine engagement may be based on a current position of an accelerator pedal and a driver profile. The method may further include controlling motor torque profile based on the reduced driver request torque.

10 Claims, 10 Drawing Sheets

(56) References Cited

U.S. PATENT DOCUMENTS

| | | | |
|---|---|---|---|
| 11,664,274 B2* | 5/2023 | Wallace | H01L 21/31144 |
| | | | 257/774 |
| 2012/0083952 A1* | 4/2012 | Smith | B60K 6/442 |
| | | | 180/65.265 |
| 2018/0170356 A1* | 6/2018 | Lee | B60W 20/30 |
| 2018/0170357 A1* | 6/2018 | Lee | B60W 10/02 |
| 2018/0251117 A1* | 9/2018 | Yamazaki | B60W 10/11 |
| 2020/0269702 A1 | 8/2020 | Meyer et al. | |
| 2021/0023944 A1 | 1/2021 | Ravichandran et al. | |
| 2021/0171012 A1 | 6/2021 | Ravichandran et al. | |
| 2021/0339733 A1* | 11/2021 | Saito | B60W 20/40 |

* cited by examiner

METHOD FOR SHAPING MOTOR TORQUE PROFILE DURING A LAUNCH ENGINE START

FIELD

The present description relates generally to methods and a system for shaping a motor torque profile during a hybrid vehicle launch with engine start request.

BACKGROUND/SUMMARY

A Modular Hybrid Transmission (MHT) for a hybrid vehicle may include a low voltage starter and high voltage electric machine for starting an internal combustion engine. A disconnect clutch may be utilized to allow the engine to be decoupled from downstream powertrain components and shutdown independently of vehicle operation. A torque converter may be positioned between the electric machine and transmission, the torque converter having various functions including torsional isolation.

During hybrid vehicle operation, mode transitions, e.g., transition from electric power only to hybrid power, may produce undesirable longitudinal acceleration oscillations, referred to as jerk and/or vehicle shuffle. Jerk and/or vehicle shuffle are caused by the torsional dynamics of a drivetrain during torque transients. As one example, during an electric power launch (e.g., from zero vehicle speed) when an engine start is requested, motor torque may increase until the electric machine reaches system capability. The provided motor torque may produce acceleration that is not sustainable until after the engine is connected to the driveline. While it may be desirable to launch the vehicle via the electric machine prior to engine connection, during such a launch engine start, abrupt torque variations occurring between the engine start request and engine connection can increase longitudinal acceleration oscillations. Vehicle shuffle during an engine launch start may be a source of discomfort for passengers, reducing drivability, and impacting drivetrain component durability over time.

Attempts to address vehicle shuffle during a hybrid vehicle launch with engine start include adjusting a motor torque based upon a sum of propulsion torque and compensation torque, provided to the engine disconnect clutch for an engine start. However, without anticipating driver behavior from engine start request to engine connection, motor torque shaping may increase vehicle shuffle, rather than reduce the occurrence.

In one example, the issues described above may be addressed by a method for shaping a torque profile for a motor of a vehicle, the method comprising: during a vehicle launch, an off condition of an engine, and upon receiving an engine start request; predicting a time of engine engagement; predicting a driver requested torque at the engine engagement; and, reducing the driver requested torque until the predicted time of engine engagement based on the predicted driver requested torque at the engine engagement. In this way, by reducing the driver requested torque, the motor torque may be shaped prior to engine start connection to reduce vehicle shuffle and deliver a smoother acceleration profile.

As one example, the method includes predicting at least one of the time of engine engagement and the driver requested torque at the engine engagement may be based on a current position of an accelerator pedal and a driver profile, such as by evaluating past driving behavior of a driver. In another example, the method includes controlling motor torque profile based on the reduced driver requested torque, including a ramping up and ramping down of a percent reduction based on the predicted driver requested torque at the engine engagement and may not end until the predicted time or after. The hybrid vehicle operating in this way, with the acceleration profile customized to the driver, reduces abrupt torque changes, enhancing the driving experience and increasing driveline component longevity.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
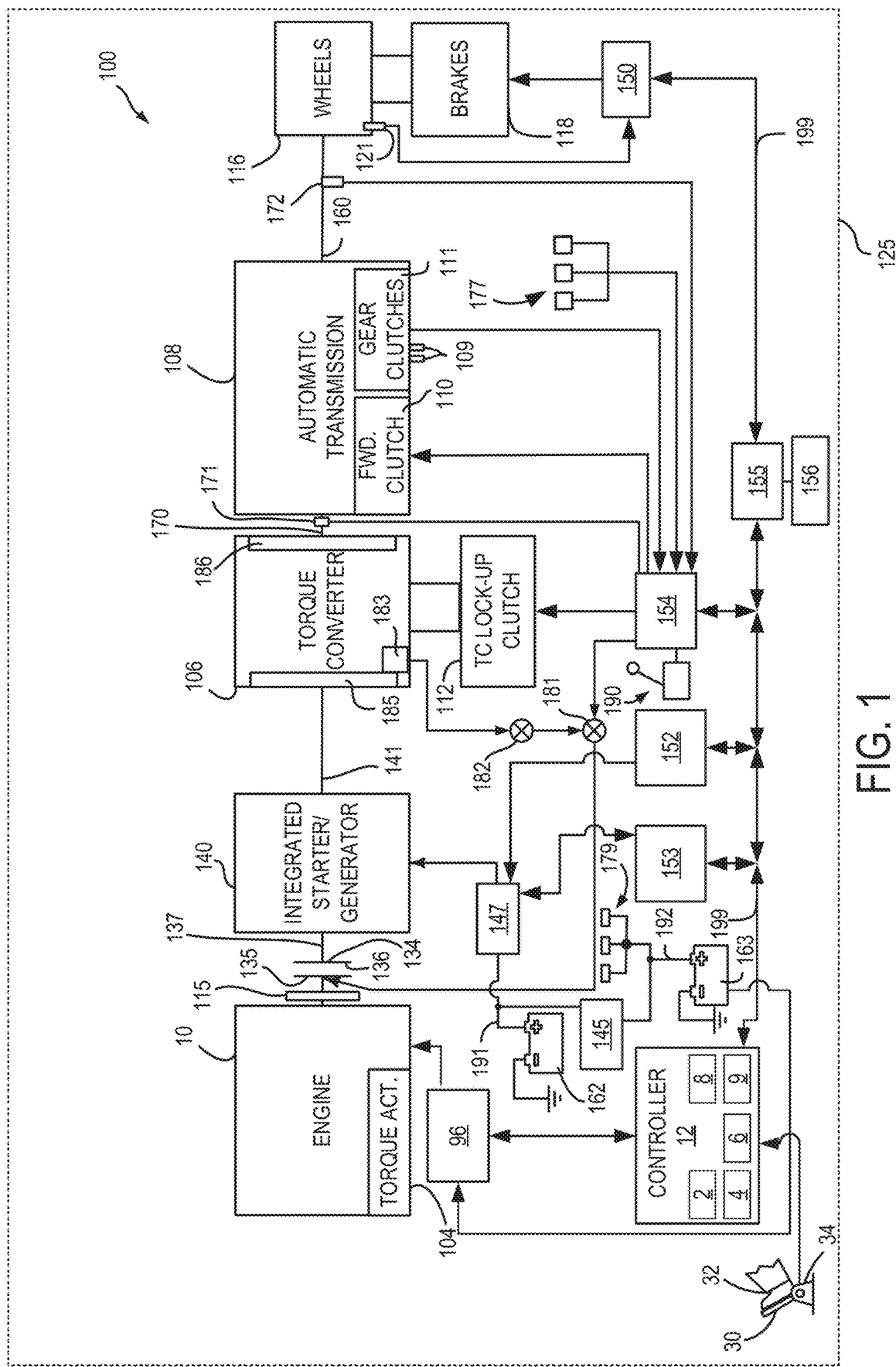
FIG. 1 is a schematic diagram of a hybrid vehicle driveline.
Figure 2:
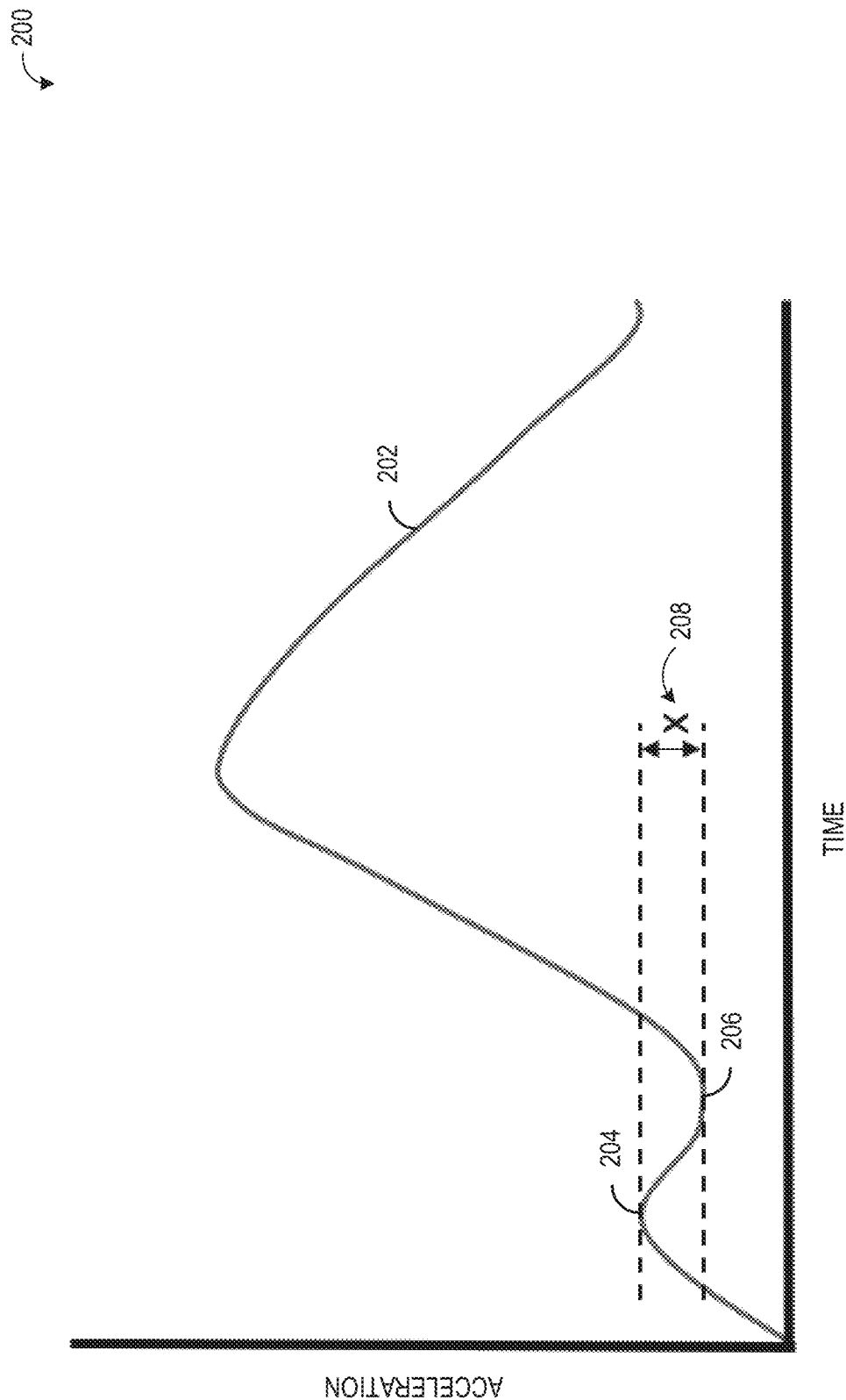
FIG. 2 is a plot of vehicle acceleration illustrating vehicle shuffle.
Figure 3:
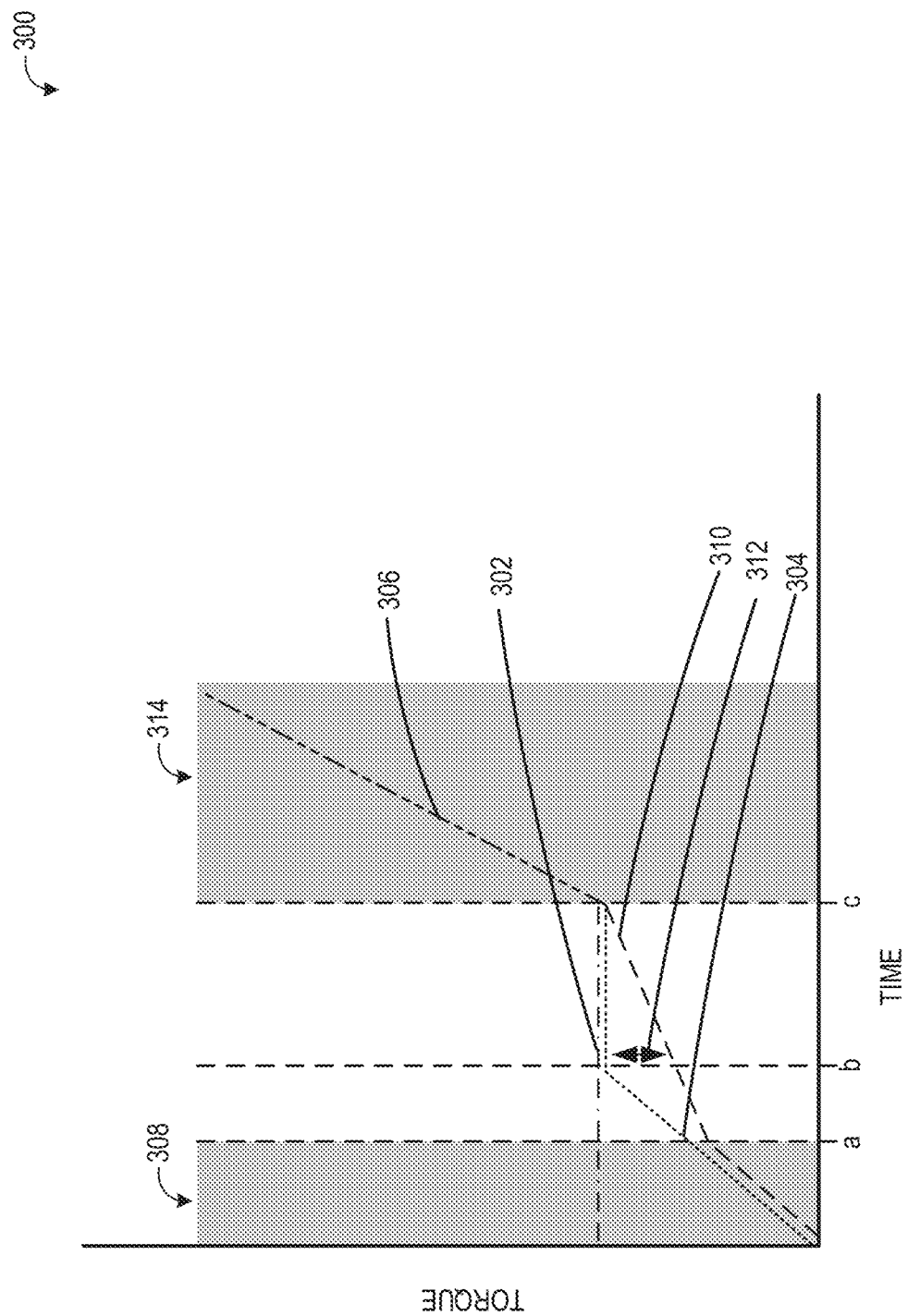
FIG. 3 is a plot illustrating motor torque shaping during an engine launch start.
Figure 4:
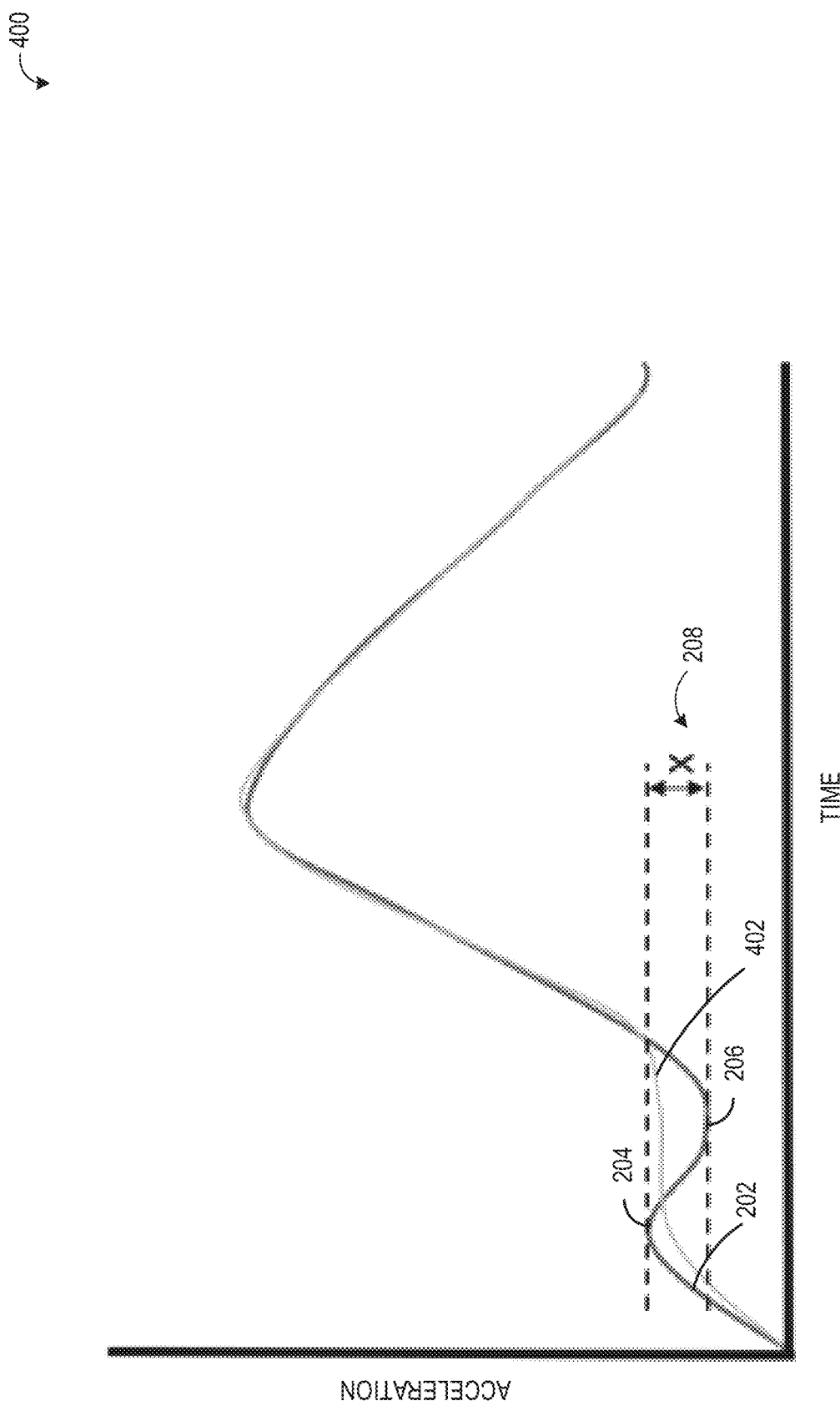
FIG. 4 is a plot of vehicle acceleration with and without motor torque shaping.
Figure 6:
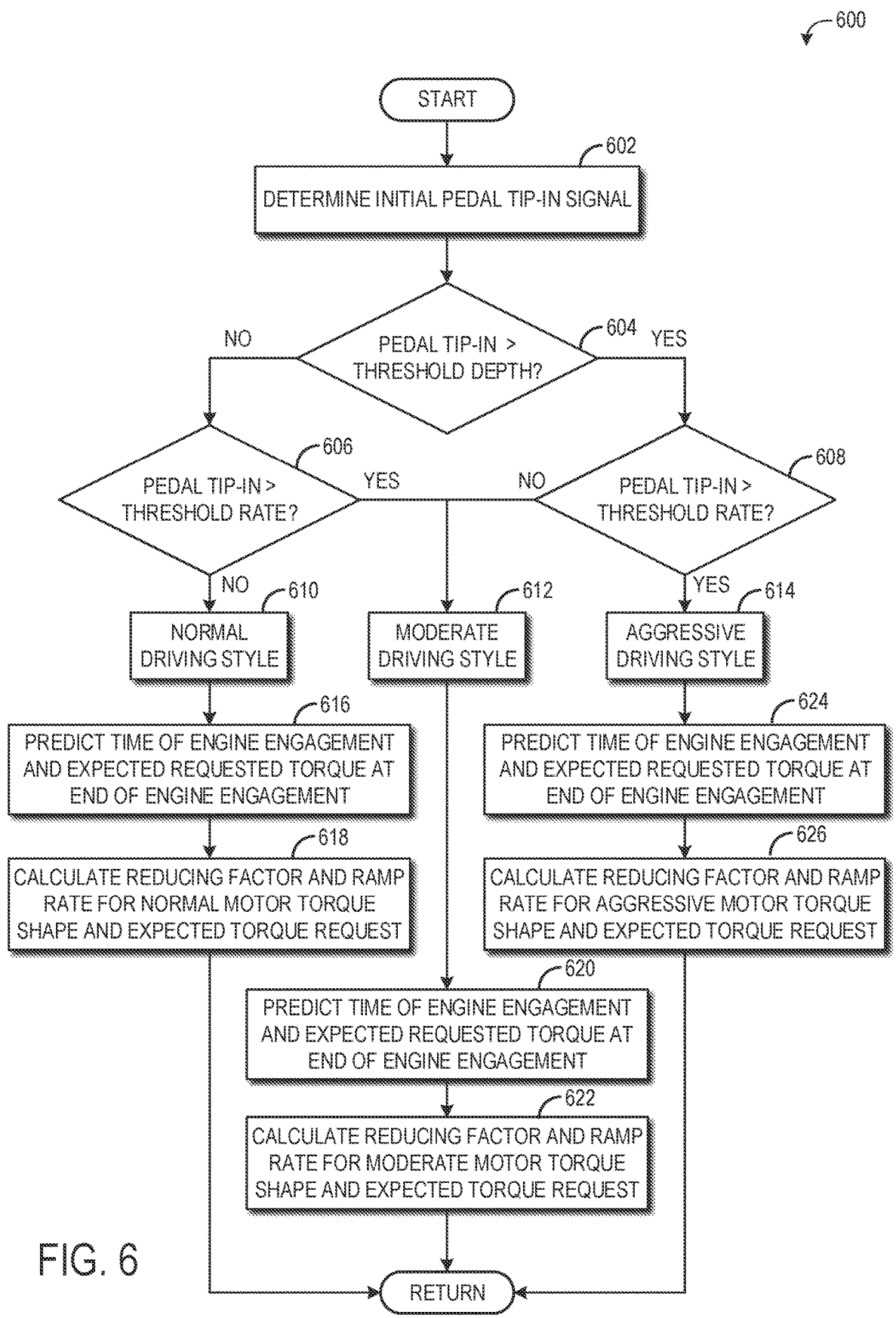
FIG. 6 is a flow chart illustrating a second method for shaping a motor torque during an engine launch start.
Figure 7:
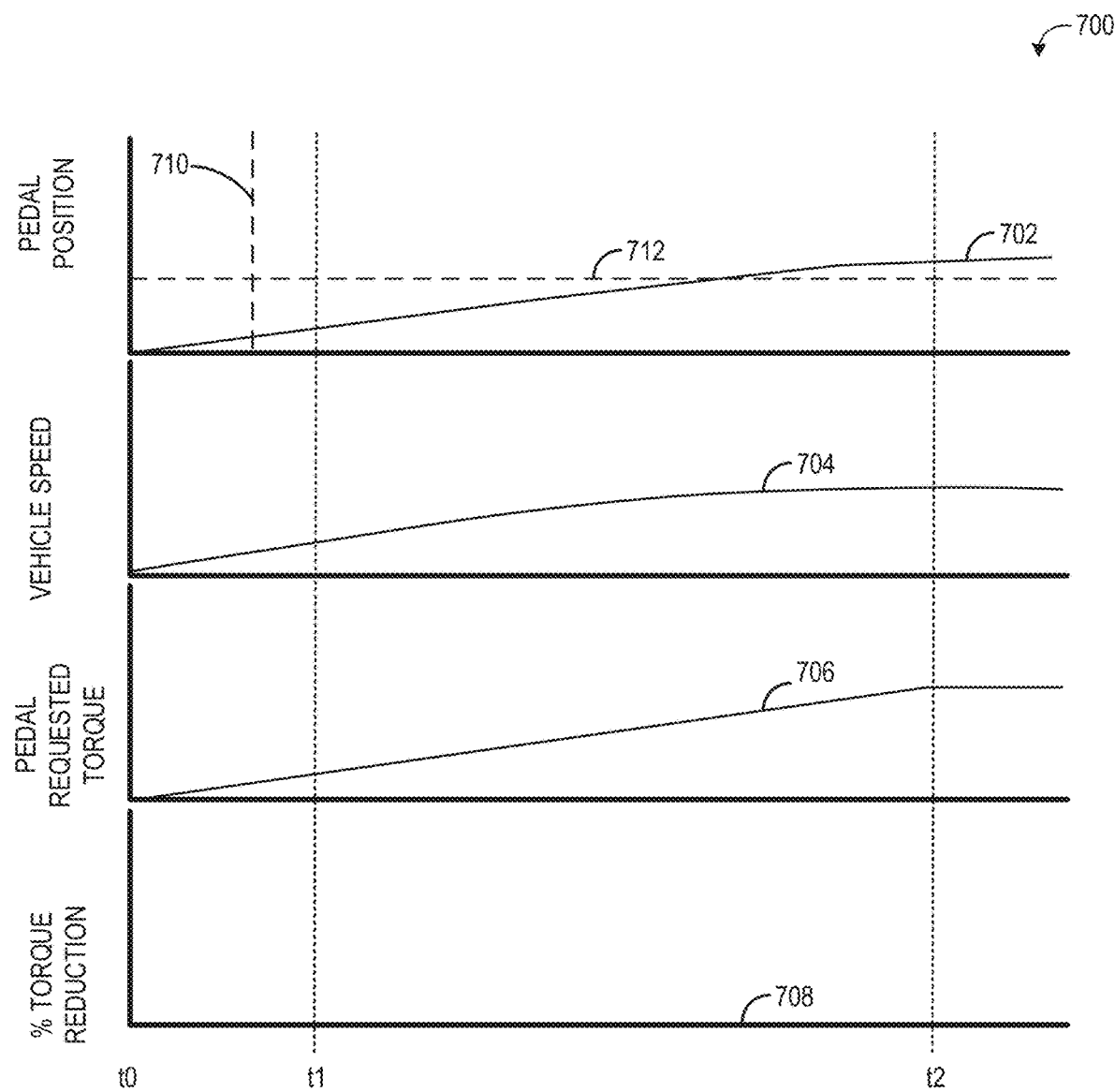
FIG. 7 is a timing diagram illustrating an example prophetic vehicle launch without engine start request.
Figure 8:
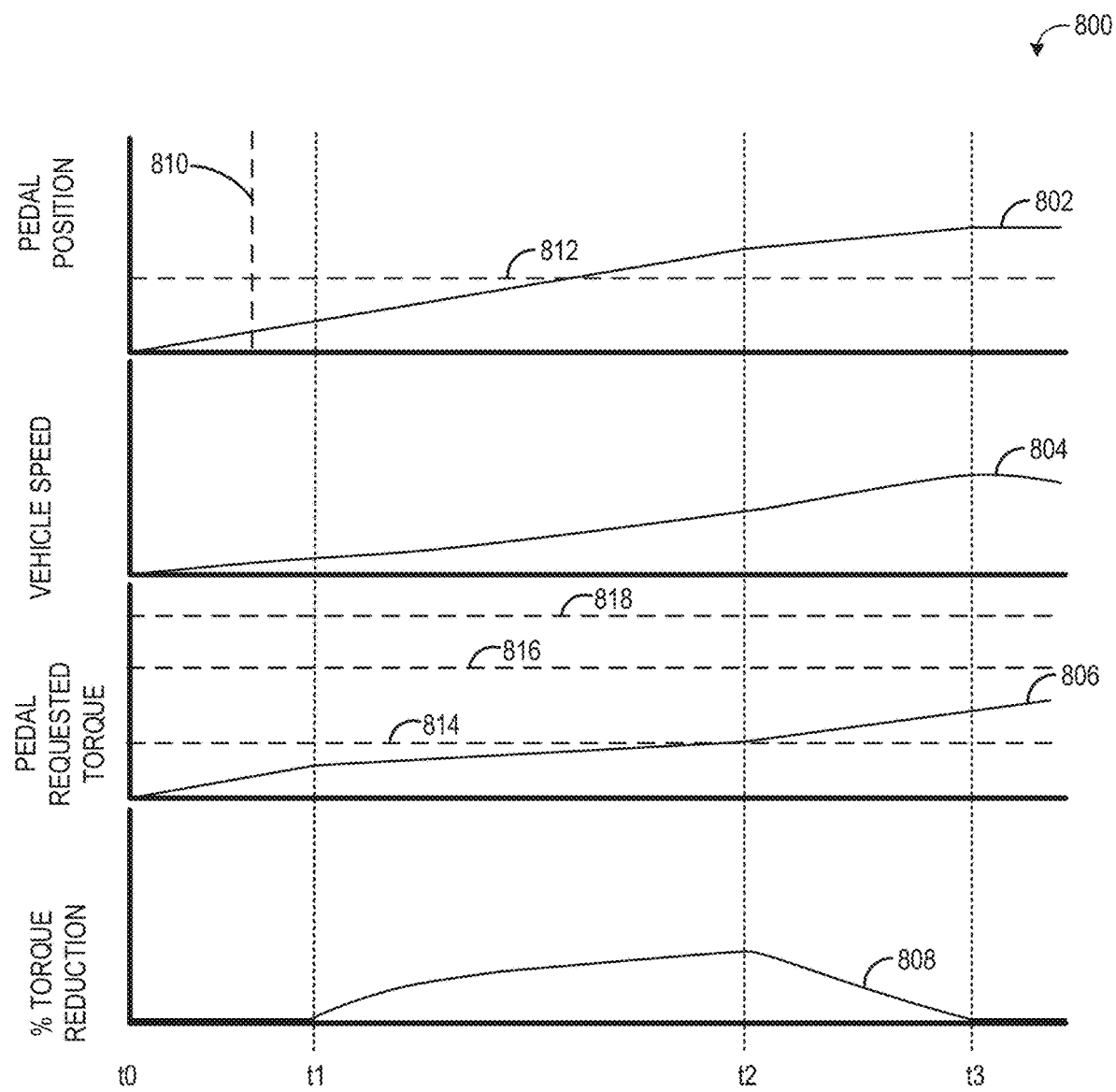
FIG. 8 is a timing diagram illustrating an example prophetic operation of method for shaping a motor torque during an engine launch start for a driver with a normal driving style.
Figure 9:
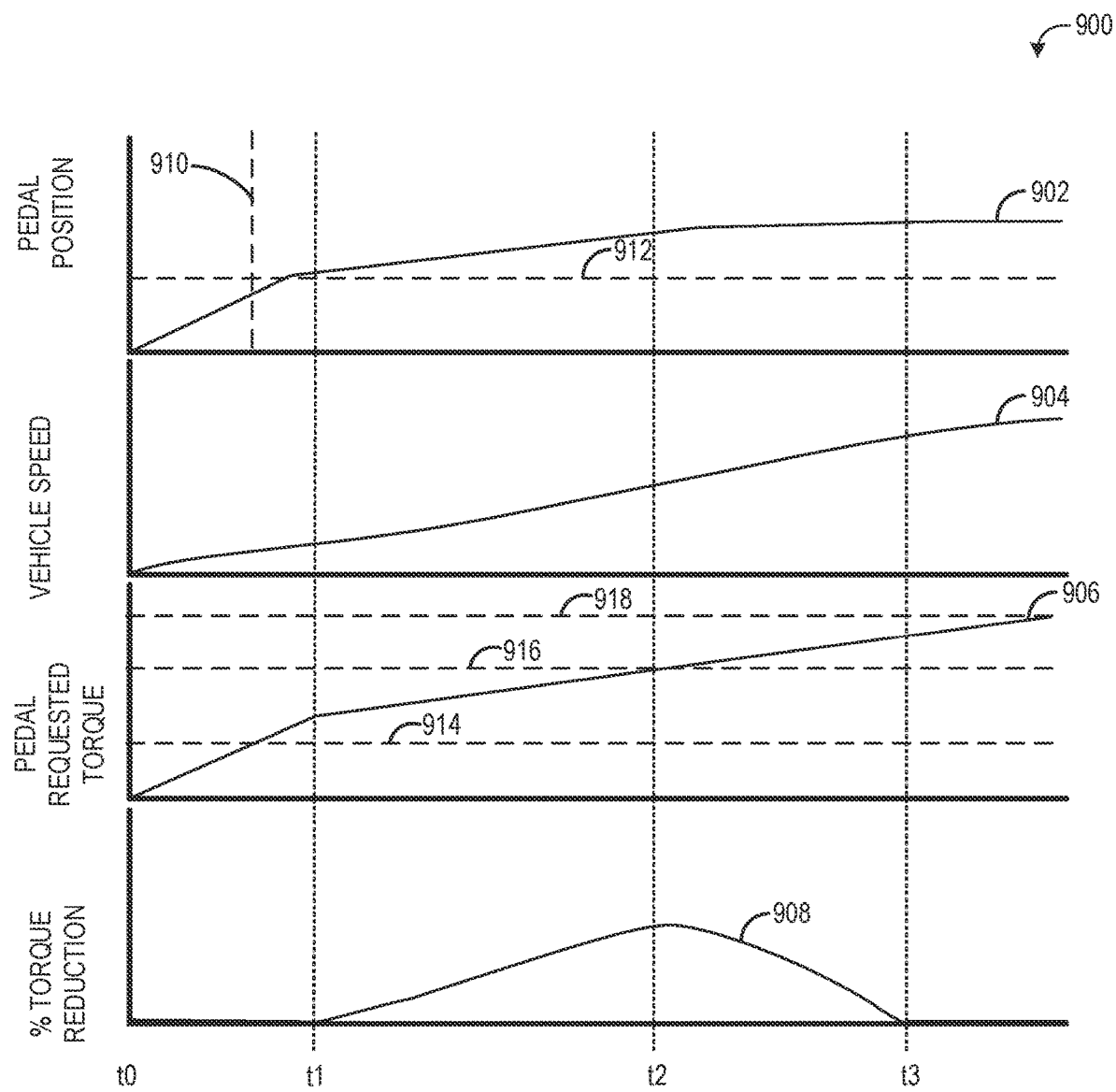
FIG. 9 is a timing diagram illustrating an example prophetic operation of method for shaping a motor torque during an engine launch start for a driver with a moderate driving style.
Figure 10:
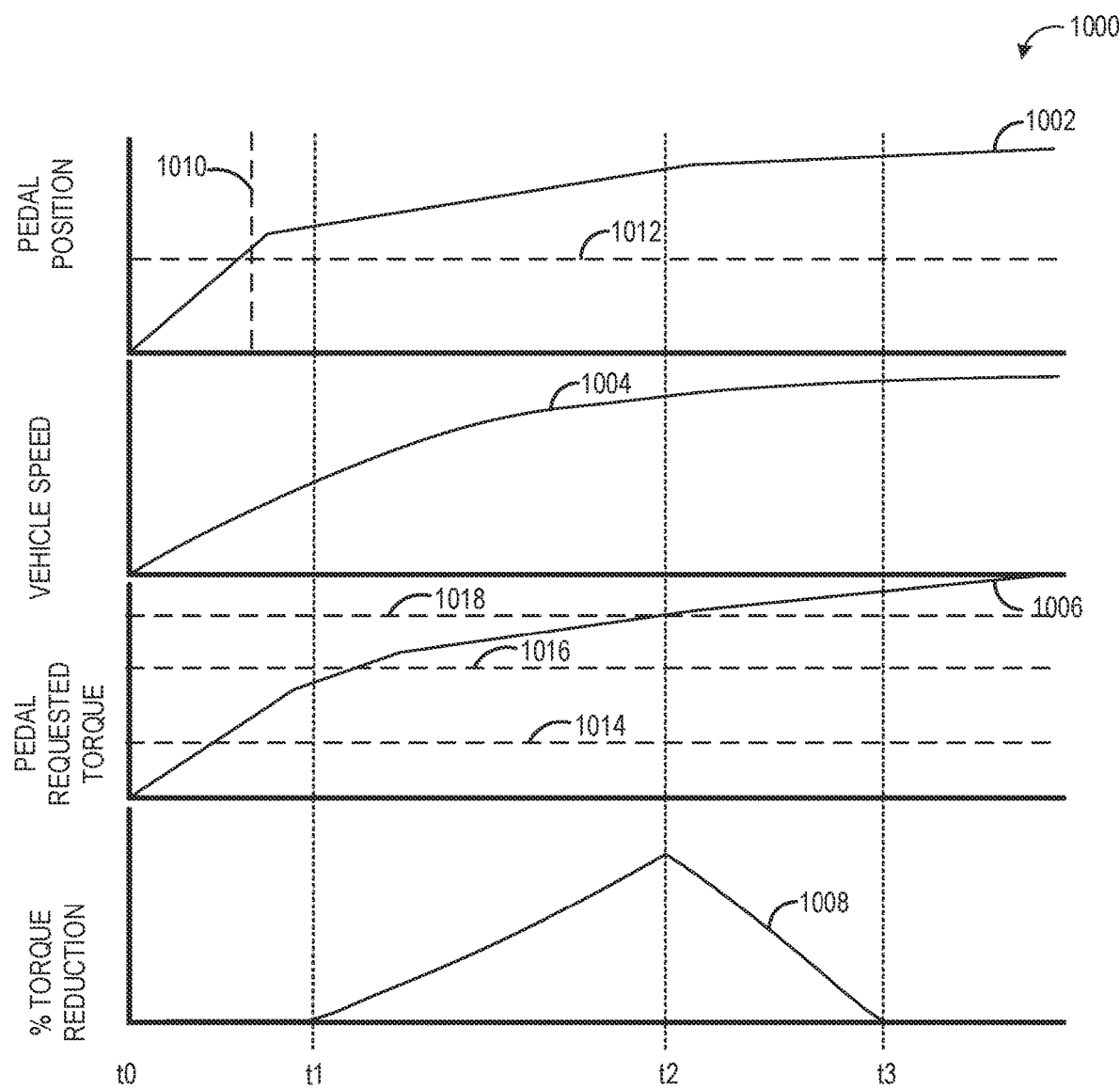
FIG. 10 is a timing diagram illustrating an example prophetic operation of method for shaping a motor torque during an engine launch start for a driver with an aggressive driving style.

The present description is related to shaping a vehicle acceleration profile for a modular hybrid transmission (MHT) hybrid vehicle. Particularly, during a vehicle launch from zero speed when engine start is requested prior to engine connection to the driveline. The engine may be part of a hybrid powertrain or driveline that includes two or more engine starting systems. The first engine starting system may be a conventional low voltage starter while the second starting system may be a driveline disconnect clutch and high voltage electric motor/generator, herein referred to as an integrated starter/generator (ISG), as shown in FIG. 1. An example vehicle acceleration profile illustrating vehicle shuffle produced during an ISG launch with an engine start request is shown in FIG. 2. After an engine start request is detected, shaping on the motor torque prior to the engine start may provide a smoother acceleration profile with less shuffle. FIG. 3 shows the region when the motor torque shaping occurs is between time 'a' and 'c'. When the logic is active a calibratable rate of torque reduction may be selected and applied until the end of engine connection at time c'. FIG. 4 shows exemplary vehicle acceleration profile without and with motor torque shaping. The motor torque may be shaped according to the methods described in FIG. 5 and FIG. 6. A timing diagram illustrating a motor torque profile during a vehicle launch without and engine start request is shown in FIG. 7. Timing diagrams for an example prophetic operation of a method for shaping a motor torque profile during engine launch start for a normal, moderate, and aggressive driver, are shown in FIGS. 8-10, respectively.

FIG. 1 is a block diagram of a vehicle 125 including a driveline or powertrain 100. Powertrain 100 is shown including vehicle system controller 155, engine controller 12, electric machine controller 152, transmission controller 154, energy storage device controller 153, and brake controller 150. Engine controller 12 is shown as a conventional microcomputer including: microprocessor unit 2, input/output ports 4, read-only memory 6 (e.g., non-transitory memory), random access memory 8, keep alive memory 9, and a conventional data bus. Engine controller 12 is shown receiving signals from sensors coupled to vehicle including a pedal position sensor 34 coupled to accelerator pedal 30 for sensing force applied by driver 32. The controllers may communicate over controller area network (CAN) 199. In addition, vehicle system controller 155 may communicate with communications system 156 (e.g., a transceiver) so that vehicle 125 may communicate with a remote server (not shown) via cellular network, satellites, vehicle to vehicle communications network, or other radio frequency communications system. Each of the controllers may provide information to other controllers such driver requested torque via pedal position sensor 34, wheel speed via wheel speed sensor 121, power output limits (e.g., power output of the device or component being controlled not to be exceeded), power input limits (e.g., power input of the device or component being controlled not to be exceeded), power output of the device being controlled, sensor and actuator data, diagnostic information (e.g., information regarding a degraded transmission, information regarding a degraded engine, information regarding a degraded electric machine, information regarding degraded brakes). Further, the vehicle system controller 155 may provide commands to engine controller 12, electric machine controller 152, transmission controller 154, and brake controller 150 to achieve driver input requests and other requests that are based on vehicle operating conditions.

For example, in response to driver 32 (human or autonomous) depressing accelerator pedal (e.g. pedal tip-in), vehicle system controller 155 may request a desired wheel power or a wheel power level to provide a desired rate of vehicle speed increase based on a position of the pedal as indicated by pedal position sensor 34 and feedback from wheel speed sensor 121. The wheel power request may be provided by vehicle system controller 155 requesting a first positive power from electric machine controller 152 and a second positive power from engine controller 12, the first and second powers providing a desired driveline positive power at vehicle wheels 116. Positive power may maintain or increase speed of the driveline and wheel rotation.

In other examples, the partitioning of controlling powertrain devices may be partitioned differently than is shown in FIG. 1. For example, a single controller may take the place of vehicle system controller 155, engine controller 12, electric machine controller 152, transmission controller 154, and brake controller 150. Alternatively, the vehicle system controller 155 and the engine controller 12 may be a single unit while the electric machine controller 152, the transmission controller 154, and the brake controller 150 are stand-alone controllers.

In this example, powertrain 100 may be powered by engine 10 and driveline integrated starter/generator (ISG) 140. In other examples, engine 10 may be omitted. Engine 10 may be started with low voltage engine starting system 96 or via driveline integrated starter/generator (ISG) 140. Driveline ISG 140 (e.g., high voltage [operated with greater than 30 volts] electrical machine) may also be referred to as an integrated starter/generator, electric machine, high voltage electric machine, motor, and/or generator. Further, power of engine 10 may be adjusted via power actuators, such as a fuel injector, throttle, etc.

Powertrain 100 is shown to include an electric energy storage device 162. Electric energy storage device 162 may output a higher voltage (e.g., 48 volts) than electric energy storage device 163 (e.g., 12 volts). DC/DC converter 145 may allow exchange of electrical energy between high voltage bus 191 and low voltage bus 192. High voltage bus 191 is electrically coupled to higher voltage electric energy storage device 162. Low voltage bus 192 is electrically coupled to lower voltage electric energy storage device 163 and electrical accessories 179 (e.g., sensors, actuators, etc.) Low voltage engine starting system 96 is electrically coupled to lower voltage electric energy storage device 163. Electrical accessories 179 may include but are not limited to front and rear windshield resistive heaters, vacuum pumps, climate control fans, and lights. Inverter 147 converts DC power to AC power and vice-versa to enable power to be transferred between ISG 140 and electric energy storage device 162.

An engine output power may be transmitted to an input or first side of driveline disconnect clutch 135 through dual mass flywheel 115. Driveline disconnect clutch 135 may also be referred to as disconnect clutch or engine disconnect clutch. Driveline disconnect clutch 135 may be hydraulically actuated via fluid (e.g., oil) that is pressurized via pump 183. A position of valve 182 (e.g., line pressure control valve) may be modulated to control a pressure (e.g., a line pressure) of fluid that may be supplied to driveline disconnect clutch pressure control valve 181. A position of driveline disconnect clutch pressure control valve 181 may be modulated to control a pressure of fluid that is supplied to driveline disconnect clutch 135. The downstream or second side 134 of disconnect clutch 136 is shown mechanically coupled to ISG input shaft 137.

ISG 140 may be operated to provide power to powertrain 100 or to convert powertrain power into electrical energy to be stored in electric energy storage device 162 in a regeneration mode. ISG 140 is in electrical communication with electric energy storage device 162. ISG 140 has a higher output power capacity than low voltage engine starting system 96. Further, ISG 140 directly drives powertrain 100 or is directly driven by powertrain 100. There are no belts, gears, or chains to couple ISG 140 to powertrain 100. Rather, ISG 140 rotates at the same rate as powertrain 100. Electric energy storage device 162 (e.g., high voltage battery or power source) may be a battery, capacitor, or inductor. The downstream side of ISG 140 is mechanically coupled to the impeller 185 of torque converter 106 via shaft 141. The upstream side of the ISG 140 is mechanically coupled to the disconnect clutch 136. ISG 140 may provide a positive power or a negative power to powertrain 100 via operating as a motor or generator as instructed by electric machine controller 152.

Torque converter 106 includes a turbine 186 to output power to transmission input shaft 170. Transmission input shaft 170 mechanically couples torque converter 106 to automatic transmission 108. Torque converter 106 also includes a torque converter lock-up clutch 112. Power is directly transferred from impeller 185 to turbine 186 when TCC is locked. TCC is electrically operated by controller 154. Alternatively, TCC may be hydraulically locked. In one example, the torque converter may be referred to as a component of the transmission.

When torque converter lock-up clutch 112 is fully disengaged, torque converter 106 transmits engine power to automatic transmission 108 via fluid transfer between the turbine 186 and impeller 185, thereby enabling torque multiplication. In contrast, when torque converter lock-up clutch 112 is fully engaged, the engine output power is directly transferred via the torque converter clutch to a transmission input shaft 170 of automatic transmission 108. Alternatively, the torque converter lock-up clutch 112 may be partially engaged, thereby enabling the amount of power directly transferred to the transmission to be adjusted. The transmission controller 154 may be configured to adjust the amount of power transmitted by torque converter lock-up clutch 112 by adjusting the torque converter lock-up clutch in response to various engine operating conditions, or based on a driver-based engine operation request.

Torque converter 106 also includes pump 183 that pressurizes fluid to operate disconnect clutch 136, forward clutch 110, and gear clutches 111. Pump 183 is driven via impeller 185, which rotates at a same speed as ISG 140.

Automatic transmission 108 includes gear clutches 111 (e.g., gears 1-10) and forward clutch 110. Automatic transmission 108 is a fixed ratio transmission. Alternatively, automatic transmission 108 may be a continuously variable transmission that has a capability of simulating a fixed gear ratio transmission and fixed gear ratios. The gear clutches 111 and the forward clutch 110 may be selectively engaged to change a ratio of an actual total number of turns of transmission input shaft 170 to an actual total number of turns of wheels 116. Gear clutches 111 may be engaged or disengaged via adjusting fluid supplied to the clutches via shift control solenoid valves 109. Power output from the automatic transmission 108 may also be relayed to wheels 116 to propel the vehicle via output shaft 160. Specifically, automatic transmission 108 may transfer an input driving power at the transmission input shaft 170 responsive to a vehicle traveling condition before transmitting an output driving power to the wheels 116. Transmission controller 154 selectively activates or engages torque converter lock-up clutch 112, gear clutches 111, and forward clutch 110. Transmission controller also selectively deactivates or disengages torque converter lock-up clutch 112, gear clutches 111, and forward clutch 110.

A frictional force may be applied to wheels 116 by engaging friction brakes 118. In one example, friction brakes 118 for wheels 116 may be engaged in response to a human driver pressing their foot on a brake pedal (not shown) and/or in response to instructions within brake controller 150. Further, brake controller 150 may apply friction brakes 118 in response to information and/or requests made by vehicle system controller 155. In the same way, a frictional force may be reduced to wheels 116 by disengaging friction brakes 118 in response to the human driver releasing their foot from a brake pedal, brake controller instructions, and/or vehicle system controller instructions and/or information. For example, vehicle brakes may apply a frictional force to wheels 116 via controller 150 as part of an automated engine stopping procedure. A braking torque may be determined as a function of brake pedal position.

In response to a request to increase a speed of vehicle 125, vehicle system controller may obtain a driver demand power or power request from accelerator pedal 30 indicated by pedal position sensor 34. Vehicle system controller 155 then allocates a fraction of the requested driver demand power to the engine and the remaining fraction to the ISG. Vehicle system controller 155 requests the engine power from engine controller 12 and the ISG power from electric machine controller 152. If the ISG power plus the engine power is less than a transmission input power limit (e.g., a threshold value not to be exceeded), the power is delivered to torque converter 106 which then relays at least a fraction of the requested power to transmission input shaft 170. Transmission controller 154 selectively locks torque converter lock-up clutch 112 and engages gears via gear clutches 111 in response to shift schedules and TCC lockup schedules that may be based on input shaft power and vehicle speed. In some conditions when it may be desired to charge electric energy storage device 162, a charging power (e.g., a negative ISG power) may be requested while a non-zero driver demand power is present. Vehicle system controller 155 may request increased engine power to overcome the charging power to meet the driver demand power.

In response to a request to reduce a speed of vehicle 125 and provide regenerative braking, vehicle system controller may provide a negative desired wheel power (e.g., desired or requested powertrain wheel power) based on vehicle speed and brake pedal position. Vehicle system controller 155 then allocates a fraction of the negative desired wheel power to the ISG 140 and the engine 10. Vehicle system controller may also allocate a portion of the requested braking power to friction brakes 118 (e.g., desired friction brake wheel power). Further, vehicle system controller may notify transmission controller 154 that the vehicle is in regenerative braking mode so that transmission controller 154 shifts gears based on a unique shifting schedule to increase regeneration efficiency. Engine 10 and ISG 140 may supply a negative power to transmission input shaft 170, but negative power provided by ISG 140 and engine 10 may be limited by transmission controller 154 which outputs a transmission input shaft negative power limit (e.g., not to be exceeded threshold value). Further, negative power of ISG 140 may be limited (e.g., constrained to less than a threshold negative threshold power) based on operating conditions of electric energy storage device 162, by vehicle system controller 155, or electric machine controller 152. Any portion of desired negative wheel power that may not be provided by ISG 140 because of transmission or ISG limits may be allocated to engine 10 and/or friction brakes 118 so that the desired wheel power is provided by a combination of negative power (e.g., power absorbed) via friction brakes 118, engine 10, and ISG 140.

Accordingly, power control of the various powertrain components may be supervised by vehicle system controller 155 with local power control for the engine 10, automatic transmission 108, electric machine 140, and friction brakes 118 provided via engine controller 12, electric machine controller 152, transmission controller 154, and brake controller 150.

As one example, an engine power output may be controlled by adjusting a combination of spark timing, fuel pulse width, fuel pulse timing, and/or air charge, by controlling throttle opening and/or valve timing, valve lift and boost for turbo- or super-charged engines. In the case of a diesel engine, controller 12 may control the engine power output by controlling a combination of fuel pulse width, fuel pulse timing, and air charge. Engine braking power or negative engine power may be provided by rotating the engine with the engine generating power that is insufficient to rotate the engine. Thus, the engine may generate a braking power via operating at a low power while combusting fuel, with one or more cylinders deactivated (e.g., not combusting fuel), or with all cylinders deactivated and while rotating the engine. The amount of engine braking power may be adjusted via adjusting engine valve timing. Engine valve timing may be adjusted to increase or decrease engine compression work. Further, engine valve timing may be adjusted to increase or decrease engine expansion work. In all cases, engine control may be performed on a cylinder-by-cylinder basis to control the engine power output.

Electric machine controller 152 may control power output and electrical energy production from ISG 140 by adjusting current flowing to and from field and/or armature windings of ISG as is known in the art.

Transmission controller 154 receives transmission input shaft position via position sensor 171. Transmission controller 154 may convert transmission input shaft position into input shaft speed via differentiating a signal from position sensor 171 or counting a number of known angular distance pulses over a predetermined time interval. Transmission controller 154 may receive transmission output shaft torque from torque sensor 172. Alternatively, sensor 172 may be a position sensor or torque and position sensors. If sensor 172 is a position sensor, controller 154 may count shaft position pulses over a predetermined time interval to determine transmission output shaft velocity. Transmission controller 154 may also differentiate transmission output shaft velocity to determine transmission output shaft rate of speed change. Transmission controller 154, engine controller 12, and vehicle system controller 155, may also receive addition transmission information from sensors 177, which may include but are not limited to pump output line pressure sensors, transmission hydraulic pressure sensors (e.g., gear clutch fluid pressure sensors), ISG temperature sensors, gear shift lever sensors, and ambient temperature sensors. Transmission controller 154 may also receive requested gear input from gear shift selector 190 (e.g., a human/machine interface device). Gear shift selector 190 may include positions for gears 1-N (where N is an upper gear number), D (drive), and P (park).

Vehicle system controller 155 receives tip-in request information via accelerator pedal 30 and pedal position sensor 34. Vehicle system controller 155 calculates desired motor torque and/or engine torque based on the position of accelerator pedal 30 and vehicle speed mapping to desired wheel torque. Vehicle system controller 155 applies the calculated torque to the ISG 140 and/or engine 10 to provide torque responsive to the power command from accelerator pedal 30. Vehicle system controller 155 may adjust mapping between accelerator pedal 30 and the amount of torque the motor provides under certain conditions. For example, during a launch from zero speed concurrent with an engine start request, vehicle system controller 155 may shape the motor torque to smooth vehicle acceleration between engine start request and engine connection. Torque shaping may including modifying driver requested torque by applying a reducing factor for a determined rate and duration. As one example, the rate and duration may be determined based on a prediction of driving style for the vehicle operator with inputs from an initial pedal tip-in signal such as a position of the pedal and a position rate of change, and respective thresholds. For a predicted driving style, such as normal, moderate, and/or aggressive, the reducing factor may be applied to the driver requested torque at a calculated ramp rate and the reducing factor ramped down to the predicted torque request at engine connection.

Thus, the system of FIG. 1 provides for a system for a vehicle, comprising: an internal combustion engine; an electric motor; a disconnect clutch coupled between the internal combustion engine and the electric motor; and a control system with instructions stored therein that when executed are for shaping a motor torque profile, including: during a vehicle launch and while an the engine transitions from an engine-off condition to a combusting and engaged condition, upon receiving an engine start request: predicting a time of engine engagement and reducing a driver requested torque with a ramped reduction that ends at the predicted time of engine engagement. In a first example of the system, the reducing of the driver requested torque is based on a prediction of driver requested torque at the engine engagement and a driver profile, wherein the driver profile is based on past driving behavior of a driver. In a second example of the system that may include the first example, reducing the driver requested torque includes a percent reduction that ramps up and ramps down.

FIG. 2 shows a plot 200 illustrating first acceleration profile 202 for a launch engine start including a vehicle shuffle event. The y-axis represents vehicle acceleration and the x-axis represents duration of time. During an electric motor (e.g., ISG 140 in FIG. 1) launch from zero speed when engine start is requested, the motor torque increases until it reaches system capability, shown as initial acceleration peak 204. The motor torque at system capability provides acceleration that is not sustainable until after the engine is connected, resulting in drop in acceleration at dip 206. Upon engine connection, acceleration increases in response to increased available torque. In the example, variation in available torque from engine request to engine engagement produces longitudinal acceleration oscillation, shown as shuffle 208 with a range of 'x' from initial acceleration peak 204 to dip 206.

In one embodiment of the system and methods disclosed herein, after a launch engine start request is indicated, motor torque shaping may smooth the acceleration profile and reduce shuffle. FIG. 3 shows a plot 300 illustrating a profile of motor torque during an engine launch start. Time 'a' represents an engine start request. Time 'c' represents the end of engine connection. In some examples, anti-jerk control shaping may be applied before engine start request at time 'a' and after time 'c', shown in the figure as regions 308, 314. Examples of anti-jerk control shaping include feedforward and/or feedback control-based torque correction during tip-in/tip-out. The region where the methods for torque shaping as disclosed herein may be applied is between time 'a' and 'c'. Available motor torque (e.g., system capability) is indicated with a dash dot line 302.

Without motor torque shaping, first motor torque 304 may increase to the available motor torque. First motor torque 304 reaches the available motor torque at time 'b'. From time 'b' to 'c', first motor torque 304 increases no further. Engine torque 306 increases upon engine connection at time 'c'. Without motor torque shaping, the variation in available torque may produce vehicle shuffle. Motor torque shaping may be applied to second motor torque 310 between 'a' and 'c' according to the example methods described herein. From time 'a' to 'c', the torque response of the motor to driver requested torque may be reduced down, e.g., by a calibratable rate. The reduction applied to driver requested torque is indicated by arrow 312. Reducing driver requested torque in this way enables the vehicle to more gradually achieve available motor torque at the end of engine connection 'c', minimizing vehicle shuffle.

FIG. 4 shows a plot 400 illustrating first acceleration profile 202 with vehicle shuffle event (e.g., from FIG. 2) and a second acceleration profile 402 with reduced vehicle shuffle. The y-axis represents vehicle acceleration and the x-axis represents duration of time. As shown in FIG. 2, during an electric motor (e.g., ISG 140 in FIG. 1) launch from zero speed when engine start is requested, without motor torque shaping, the vehicle reaching system capability (e.g., ceiling) motor torque prior to engine connection produces a rate of increasing acceleration that is not that is not sustainable until after the engine is connected, producing shuffle 208 with a range of 'x' from initial acceleration peak 204 to dip 206. With torque shaping applied to the driver requested torque according to system and methods described herein, second acceleration profile 402 illustrates vehicle shuffle is substantially reduced due to the acceleration increasing more smoothly between engine start request and engine connection.

Figure 5:
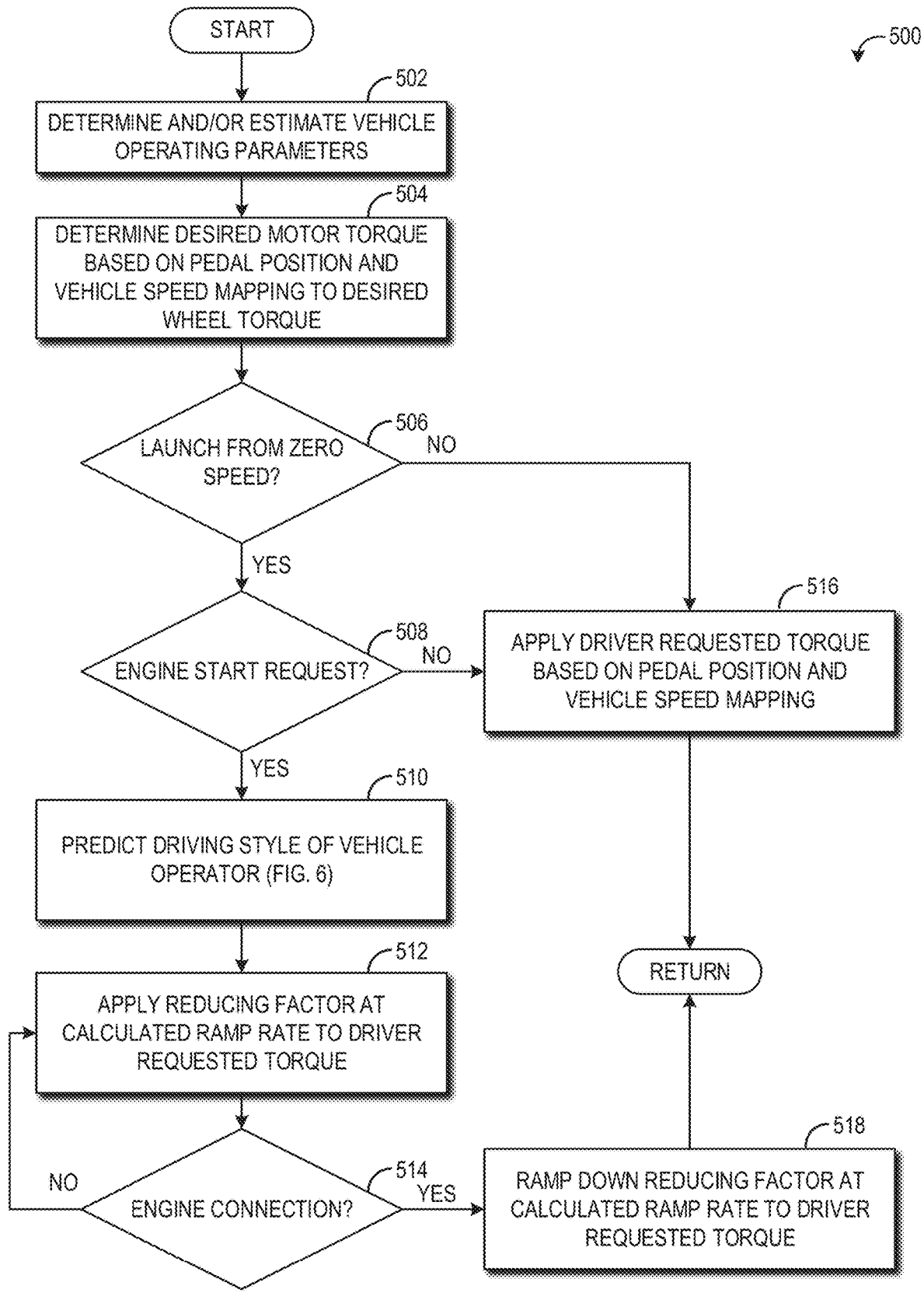
FIG. 5 is flow chart illustrating a method for shaping a motor torque during an engine launch start.

Control routines for shaping motor torque in a MHT hybrid vehicle are described below with reference to FIG. 5 and FIG. 6. FIG. 5 illustrates a method 500 for shaping motor torque during a launch from zero speed with engine start request. In the example method 500, motor torque shaping may include reducing driver requested torque until a predicted time of engine engagement based on predicted driver requested torque at the engine engagement. Motor torque shaping during a launch engine start may be based on a prediction of driving style for a vehicle operator. A method 600 for predicting driving style based on an initial pedal tip-in signal is illustrated in FIG. 6. Instructions for carrying out method 500 and the rest of the methods included herein may be executed by a controller (e.g., engine controller 12, vehicle system controller 155) based on instructions stored on a memory of the controller and in conjunction with signals received from sensors of the engine system, such as the sensors described above with reference to FIG. 1 (e.g., pedal position sensor 34). The controller may employ actuators of the MHT hybrid system to adjust ISG and engine operation, according to the methods described below.

At 502, method 500 determines and/or estimates vehicle operating parameters. As one example, vehicle operating parameters may include an on/off status of an electric machine (e.g., ISG 140), a position of an accelerator pedal, a wheel speed, a wheel torque, and an engagement status of an engine.

At 504, method 500 includes determining desired motor torque based on the position of the accelerator pedal (e.g., accelerator pedal 30 in FIG. 1) and vehicle speed mapping to desired wheel torque. The position of the accelerator pedal may be measured by a pedal position sensor (e.g., pedal position sensor 34). The pedal position sensor is in electronic communication with the controller (e.g., controller 12) and outputs a signal indicative of pedal position. The controller interprets the pedal position signal to determine a desired motor torque.

At 506, the method includes determining if a launch from zero speed is indicated. A launch from zero speed may be indicated by a signal from wheel speed sensors (e.g., wheel speed sensor 121) in communication with the controller. If a launch from zero speed is not indicated, the method continues to 516. If a launch from zero speed is indicated, the method continues to 508. At 508, the method includes determining whether an engine start request is indicated (and therefore the engine is in an off condition). As one example, an engine start request may be indicated by a driver operated button. If an engine start request is not indicated, the method continues to 516. At 516, the method includes applying driver requested torque based on pedal position and vehicle speed mapping. Returning to 508, if an engine start request is indicated, the method continues to 510.

At 510, the method includes predicting a driving style of a vehicle operator. In one example, predicting the driving style of the vehicle operator allows the controller to anticipate the timing of the engine torque disturbance and the shape of the torque request from engine start request until engine engagement including predicting a torque request at engine engagement. The driving style prediction enables the controller to tailor the amount of temporary reduction applied to the actual driver requested torque (e.g., shaping) and the rate of reduction ramp up and ramp down, for a gradual acceleration from launch to the engine connection. As one example, vehicle operator driving style may be predicted based on how hard and how far the driver tips-in at vehicle launch. Signal inputs may include an initial position of the accelerator pedal and rate of change of the pedal position and calibratable thresholds therefor. As another example, driving style may be learned over time with signal inputs processed by a neural network. Driving style may be categorized, e.g., aggressive, moderate, normal, and torque shaping determined based on a prediction of driver requests. An example method for predicting driving style, as well as predicting the request driver torque and resulting time or torque at engine engagement, is illustrated below with reference to FIG. 6.

At 512, the method includes applying a reducing factor at a calculated ramp rate to driver requested torque. As one example, the reducing factor, and ramp rate may be based on a predicted driver requested torque at engine engagement that is determined based on the driving style prediction. For example, the reducing factor may be a percent reduction from pedal position to motor torque mapping that ramps up and then down. The controller may ramp up by percent reduction increments to the maximum reducing factor based on an estimate of motor torque request from engine start request until engine connection. Then, based on the reduced driver requested torque, the system then controls the powertrain to provide the reduced driver requested torque by adjustment of the motor torque output and/or engine torque output (once started and at least partly engaged).

At 514, the method includes determining whether engine connection to the driveline is indicated. If engine connection is indicated, the method continues to 518. At 518, the method includes ramping down the reducing factor applied to the driver requested torque at a calculated ramp rate. In one example, the calculated ramp rate is determined based on the driving style prediction including the predicted torque request at engine connection. In one example, reducing the driver requested torque based on the predicted driver requested torque at the engine engagement does not end until the predicted time or after.

In another example, reducing the driver requested torque based on the predicted driver requested torque may occur only after the vehicle begins moving above a threshold non-zero positive speed, and only when the engine transitions from a stopped and unengaged condition to a combusting and engaged condition. In such an example, the engine may be coupled through a disconnect clutch to the motor and an output of the motor is coupled to a torque converter or launch clutch, an output of which is coupled through a transmission including a final drive to vehicle wheels. In another example, reducing the driver requested torque until the predicted time of engine engagement may be based on the predicted driver requested torque at the engine engagement including reducing a current driver requested torque.

FIG. 6 illustrates method 600 for predicting driving style for a vehicle operator based on a current position of an accelerator pedal, referred to as an initial pedal tip-in signal. The driving style prediction may be used to determine torque shaping during a launch engine start. Method 600 also provides for an approach to predict the driver requested torque profile throughout the launch and engine start, and further to predict the timing of engine engagement so as to better manage artificial reduction, via the controller, of the driver torque request.

In one embodiment, method 600 may be a subroutine of the method depicted in FIG. 5. Accordingly, in one embodiment, method 600 may partially or wholly substitute step 510 in method 500. In one example, the subroutine may performed to predict the driving style for a vehicle operator in order to make further predictions about driver behavior for a duration from an engine start request until engine engagement. The prediction may enable driver-tailored torque shaping and provide for smoother vehicle acceleration.

At 602, the method 600 includes determining an initial pedal tip-in signal. For example, the controller may receive one or more initial pedal tip-in signal inputs indicating how far the accelerator pedal was pushed (e.g., pedal depth) and how hard or how quickly the pedal reached the position (e.g., pedal rate of change).

At 604, the method 600 includes determining whether the depth of the initial pedal tip-in is greater than a threshold depth. The threshold depth may be preset non-zero threshold, e.g., calibratable based on vehicle specifications, pedal position, and vehicle speed mapping to torque, machine learning, etc. As an example, the threshold depth may be a percent of full throttle. If a pedal position greater than the threshold depth is indicated, the method continues to 608.

At 608 the method 600 includes determining whether the rate of change of the initial pedal tip-in is greater than a threshold rate of change. The threshold rate of change may be a preset non-zero threshold, similarly calibratable as the threshold pedal position. If an initial pedal tip-in signal greater than the threshold rate of change is not indicated, the method continues to 612. If an initial pedal tip-in signal greater than a threshold rate of change is indicated, the method continues to 614.

At 614, the method determines the driving style of the vehicle operator is aggressive. The method continues to 624. At 624, the method includes predicting a time of engine engagement and driver requested torque at the end of engine engagement. For example, the controller may predict for an aggressive driver relatively greater driver requested torque at engine engagement compared to a more moderate driver. The method continues to 626 where the method includes calculating a reducing factor and ramp rate for an aggressive torque shape and expected torque request. As an example, the reducing factor may be a percent reduction from pedal position to motor torque mapping. The ramp rate may determine how slowly or quickly the reducing factor is applied and then ramped down to driver requested torque. As one example, the reducing factor and/or ramp rate may be determined from a look-up table with inputs such as the initial tip-in signal. In one example, the reducing factor and/or ramp rate may be determined based on a machine learning model of past driver behavior derived from a network cloud-connected vehicles. In one example, the reducing factor for an aggressive driver may be relatively greater than the reducing factor for a normal or moderate driver. As another example, the controller may ramp up to the maximum reducing factor more quickly for an aggressive driver than for a normal or moderate driver.

Returning to 608, if an initial pedal tip-in signal greater than a threshold rate of change is not indicated, the method continues to 612.

At 612, the method determines the driving style of the vehicle operator is moderate. The method continues to 620. At 620, the method includes predicting a time of engine engagement and driver requested torque at the end of engine engagement. For example, the controller may predict a relatively moderate level of driver requested torque at engine connection for a moderate driver. The method continues to 622 where the method includes calculating a reducing factor and ramp rate for a moderate torque shape and expected torque request. In one example, the reducing factor for a moderate driver may be relatively greater than the reducing factor for a normal driver but relatively less than the reducing factor for an aggressive driver. As another example, the controller may ramp into and out of the maximum reducing factor less quickly for a moderate driver. Additionally or alternatively, a moderate driving style may be inferred based on a pedal tip-in signal that is less than the threshold depth (no at 604) but greater than the threshold rate of change (yes at 606).

Returning to 604, if greater than a threshold depth of the initial pedal tip-in is not indicated, the method continues to 606. At 606, the method includes determining if initial pedal tip-in rate of change greater than the threshold rate of change is indicated. If greater than threshold pedal tip-in rate of change is not indicated, the method continues to 610.

At 610, the method determines the driving style of the vehicle operator is normal. The method continues to 616. At 616, the method includes predicting a time of engine engagement. The method also includes predicting driver requested torque, during and/or at the end of engine engagement. For example, the controller may predict a relatively lower level of driver requested torque at engine connection for a normal driver compared to drivers that may be classified as moderate or aggressive. In an example, the prediction of the driver requested torque may be based on a current driver requested torque and recent past driver requested torques, along with a pre-stored profile that is based on the driver's determined driving style. The pre-stored profile or driver profile may be scaled, as an example, based on the current driver requested torque and recent past driver requested torques. Then, based on a predicted engine start timing and engagement timing (which may include estimates stored in memory that are triggered from the requested engine start timing, determined by the processor as described herein, at 508) can be determined. From the predicted engine start timing and engagement timing, the predicted torque at that timing can be determined. From those points, the system may then apply a reducing factor profile (e.g., a percent reduction at each point from the current time through to the predicted engagement time) so as to reduce the driver torque request in a way to smooth engagement.

The method continues to 618 where the method includes calculating a reducing factor and ramp rate for a normal torque shape and expected torque request. In one example, the reducing factor for a normal driver may be relatively lower than the reducing factor for a moderate driver and substantially lower than the reducing factor for an aggressive driver. As another example, the controller may ramp into and out of the maximum reducing factor less quickly for a normal driver.

FIG. 7, FIG. 8, FIG. 9, and FIG. 10 are timing diagrams illustrating a sequence of actions performed within a control routine for shaping motor torque during a launch engine start for an exemplary MHT hybrid vehicle. The control routine for motor torque shaping may be the same as or similar to the series of actions described above with reference to methods 500 and 600 in FIG. 5 and FIG. 6, respectively. The MHT hybrid vehicle may be the same or similar to vehicle 125 shown in FIG. 1. In the prophetic examples, the controller determines whether a launch engine start is indicated. If a launch engine start is indicated, the controller predicts a driving style of the vehicle operator and adjusts the motor torque accordingly. FIG. 7 depicts a scenario illustrating a vehicle launch without an engine start request. FIG. 8 depicts a scenario illustrating motor torque shaping for a driver with a normal driving style. FIG. 9 depicts a scenario illustrating motor torque shaping for a driver with a moderate driving style. FIG. 10 depicts a scenario illustrating motor torque shaping for a driver with an aggressive driving style. Instructions for performing the control routines described in timing diagrams 700, 800, 900, and 1000 may be executed by a controller (e.g., engine controller 12 and vehicle system controller 155 of FIG. 1) based on instructions stored on a memory of the controller and in conjunction with sensory feedback received from components from the vehicle driveline system, including pedal position sensor 34, ISG 140, and engine 10 described above with reference to FIG. 1. The horizontal (x-axis) denotes time and the vertical markers t0-t3 identify relevant times in timing diagrams 700, 800, 900, and 1000 of FIGS. 7, 8, 9, and 10, respectively, for shaping motor torque during a launch engine start in a MHT hybrid vehicle.

Timing diagram 700 of FIG. 7 shows plots 702, 704, 706, and 708, which illustrate states of components and/or control settings of the vehicle system over time. Plot 702 indicates a position the accelerator pedal. Plot 704 indicates a vehicle speed. Plot 706 indicates a pedal requested torque. Plot 708 indicates percent torque reduction. Pedal depth threshold 712 and pedal rate threshold 710 are given for pedal position. As described with respect to method 600, an initial pedal tip-in signal is compared to the pedal tip-in thresholds. If before time t1 the pedal position increases above the pedal depth threshold 712 (e.g., 30% of full throttle), the pedal position is greater than the threshold depth. If pedal position increases above the pedal depth threshold 712 before pedal rate threshold 710 (e.g., 30% of full throttle at 0.5 ms into a vehicle launch from zero), the pedal rate of change is greater than the threshold rate. Plots 702, 704, 706, and 708 show an increase upwards along the y-axis.

From time t0 to t1, plot 702 indicates pedal position increasing depth. Plot 706 indicates increasing pedal requested torque. Plot 704 indicates the vehicle launching from zero speed.

At t1, an engine start request is not indicated. Thus, the vehicle is launching from zero speed but the conditions for motor torque shaping are not met. Therefore, from t1 to t2, no torque reduction is applied to the pedal requested torque as indicated in plot 708. From t1 to t2, the controller applies to the motor (e.g., ISG 140) the pedal requested torque based on pedal position and vehicle speed mapping to desired wheel torque. At t2, plot 702 indicates no further increasing pedal position depth. In response, the pedal requested torque and vehicle speed level off accordingly.

FIG. 8 is a timing diagram 800 illustrating an example prophetic operation of method for shaping a motor torque during an engine launch start for a driver with a normal driving style. Timing diagram 800 shows plots 802, 804, 806, and 808, which illustrate states of components and/or control settings of the vehicle system over time. Plot 802 indicates a position the accelerator pedal. Plot 804 indicates a vehicle speed. Plot 806 indicates a pedal requested torque. Plot 808 indicates percent torque reduction. As described above, an initial pedal tip-in signal is compared to the pedal tip-in thresholds. Pedal depth threshold 812 and pedal rate threshold 810 are given for pedal position. The pedal thresholds may be the same or similar to those described in FIG. 7. Predicted torque requests at the end of engine engagement for normal, moderate, and aggressive drivers, are shown as dotted lines 814, 816, and 818 respectively. Plots 802, 804, 806, and 808 show an increase upwards along the y-axis. As illustrated, the torque reduction of 808 is ramped up and then down from zero percent reduction (no reduction). The prediction of the ending timing of the reduction (t3) is made at time t1 so as to scale the percent reduction such that zero reduction occurs a time t3. In this way, a smooth torque reduction is obtained, while also enabling a smoother engine engagement as well. In other words, from time t1 to time t3, the system is reducing the driver requested torque with lesser, then more, then lesser reduction where the reduction is ramped up and down at rates so that the ramp down ends at t3 and thus covers engine engagement. In some examples, the prediction may be biased to end at least upon engine engagement but err on ending past engagement since ending early may cause more disturbance than ending late.

From time t0 to t1, plot 802 indicates pedal position increasing depth. Plot 806 indicates increasing pedal requested torque. Plot 804 indicates the vehicle launching from zero speed.

At t1, an engine start request is indicated. Thus, the conditions for the shaping motor torque during a launch engine start are met. The controller determines the initial pedal tip-in signal by comparing the pedal position at t1 to the pedal depth threshold 812 and the pedal rate threshold 810. Plot 802 indicates pedal position at t1 is less than the pedal depth threshold 812. For example, the pedal position sensor reads a pedal position depth at 10% of full throttle. The controller determines a normal driving style for the vehicle operator. For the normal driving style, the controller predicts engine engagement at t3 and expected torque request at the end of engine engagement at 814. The controller calculates a reducing factor and ramp rate for a normal motor torque shape and expected torque request.

From t1 to t2, torque reduction is applied to the pedal requested torque as indicated in plot 808. Plot 802 shows accelerator pedal position depth increasing gradually and vehicle speed increasing accordingly. The torque reducing factor is applied to pedal requested torque ramping gradually up to maximum torque reduction.

At t2, plot 806 indicates pedal requested torque crossing the expected requested torque as the engine connects to the vehicle driveline. From t2 to t3, plot 808 indicates the torque reducing factor applied to pedal requested torque ramps down to zero torque reduction. In response driver requested torque based on pedal position and vehicle speed mapping is restored at t3.

FIG. 9 is a timing diagram 900 illustrating an example prophetic operation of method for shaping a motor torque during an engine launch start for a driver with a moderate driving style. Timing diagram 900 shows plots 902, 904, 906, and 908, which illustrate states of components and/or control settings of the vehicle system over time. Plot 902 indicates a position the accelerator pedal. Plot 904 indicates a vehicle speed. Plot 906 indicates a pedal requested torque. Plot 908 indicates percent torque reduction. As described above with respect to FIG. 7 and FIG. 8, an initial pedal tip-in signal is compared to the pedal tip-in thresholds. Pedal depth threshold 912 and pedal rate threshold 910 are given for pedal position. The pedal thresholds may be the same or similar to those described in FIG. 7 and FIG. 8. Predicted torque requests at the end of engine engagement for normal, moderate, and aggressive drivers, are shown as dotted lines 914, 916, and 918 respectively. The predicted torque requests may be the same or similar to those described in FIG. 8. Plots 902, 904, 906, and 908 show an increase upwards along the y-axis.

From time t0 to t1, plot 902 indicates pedal position increasing depth. Plot 906 indicates increasing pedal requested torque. Plot 904 indicates the vehicle launching from zero speed.

At t1, an engine start request is indicated. Thus, the conditions for the shaping motor torque during a launch engine start are met. The controller determines the initial pedal tip-in signal by comparing the pedal position at t1 to the pedal depth threshold 912 and the pedal rate threshold 910. Plot 902 indicates pedal position at t1 exceeds pedal depth threshold 912 and but not pedal rate threshold 910. For example, the pedal position sensor reads a pedal position depth at 32% of full throttle. The controller determines a moderate driving style for the vehicle operator. For the moderate driving style, the controller predicts engine engagement at t2 and expected torque request at the end of engine engagement at 916. The controller calculates a reducing factor and ramp rate for a moderate motor torque shape and expected torque request.

From t1 to t2, torque reduction is applied to the pedal requested torque as indicated in plot 908. Plot 902 shows accelerator pedal position depth increasing and vehicle speed increasing accordingly. The torque reducing factor is applied to pedal requested torque ramping at a moderate rate to maximum torque reduction.

At t2, plot 906 indicates pedal requested torque crossing the expected requested torque as the engine engages with the vehicle driveline. From t2 to t3, plot 908 indicates the torque reducing factor applied to pedal requested torque ramps down to zero torque reduction. In response driver requested torque based on pedal position and vehicle speed mapping is restored at t3.

FIG. 10 is a timing diagram 1000 illustrating an example prophetic operation of a method for shaping a motor torque during an engine launch start for a driver with an aggressive driving style. Timing diagram 1000 shows plots 1002, 1004, 1006, and 1008, which illustrate states of components and/or control settings of the vehicle system over time. Plot 1002 indicates a position the accelerator pedal. Plot 1004 indicates a vehicle speed. Plot 1006 indicates a pedal requested torque. Plot 1008 indicates percent torque reduction. As described above with respect to FIGS. 7, 8, and 9, an initial pedal tip-in signal is compared to the pedal tip-in thresholds. Pedal depth threshold 1012 and pedal rate threshold 1010 are given for pedal position. The pedal thresholds may be the same or similar to those described in FIGS. 7, 8 and 9. Predicted torque requests at the end of engine engagement for normal, moderate, and aggressive drivers, are shown as dotted lines 1014, 1016, and 1018 respectively. The predicted torque requests may be the same or similar to those described in FIG. 8 and FIG. 9. Plots 1002, 1004, 1006, and 1008 show an increase upwards along the y-axis.

From time t0 to t1, plot 1002 indicates pedal position increasing depth. Plot 1006 indicates increasing pedal requested torque. Plot 1004 indicates the vehicle launching from zero speed.

At t1, an engine start request is indicated. Thus, the conditions for the shaping motor torque during a launch engine start are met. The controller determines the initial pedal tip-in signal by comparing the pedal position at t1 to the pedal depth threshold 1012 and the pedal rate threshold 1010. Plot 1002 indicates pedal position at t1 exceeds pedal depth threshold 1012 and pedal rate threshold 1010. For example, the pedal position sensor read the accelerator pedal reached 45% full throttle at pedal rate threshold 1010 and 50% full throttle at t1. The controller determines an aggressive driving style for the vehicle operator. For the aggressive driving style, the controller predicts engine engagement at t2 and expected torque request at the end of engine engagement at 1018. The controller calculates a reducing factor and ramp rate for an aggressive motor torque shape and expected torque request.

From t1 to t2, torque reduction is applied to the pedal requested torque as indicated in plot 1008. Plot 1002 shows accelerator pedal position depth increasing and vehicle speed increasing accordingly. The torque reducing factor is applied to pedal requested torque ramping at a relatively faster rate (e.g., compared to moderate and normal driving settings) to maximum torque reduction.

At t2, plot 1006 indicates pedal requested torque crossing the expected requested torque as the engine engages with the vehicle driveline. From t2 to t3, plot 1008 indicates the torque reducing factor applied to pedal requested torque ramps down to zero torque reduction at a relatively faster rate (e.g., compared to moderate and normal driving settings). In response driver requested torque based on pedal position and vehicle speed mapping is restored at t3.

In this way, by shaping the motor torque during an MHT hybrid vehicle engine launch start based on accelerator pedal position and driver profile, an amount and duration of torque shaping may be tailored to the driver to customize the driving experience. Predicting driver requested torque over the duration of the engine start request to the engine connection enables informed adjustments to the percent torque reduction, the ramp up and ramp down, and the timing of applying torque shaping for a smoother acceleration profile with less shuffle. The technical effect of shaping motor torque during an engine launch start is increased drivability and reduced torsional wear on the drivetrain.

The disclosure also provides support for a method for shaping a torque profile for a motor of a vehicle, the method comprising: during a vehicle launch, an off condition of an engine, and upon receiving an engine start request, predicting a time of engine engagement, predicting a driver requested torque at the engine engagement, and, reducing the driver requested torque until the predicted time of engine engagement based on the predicted driver requested torque at the engine engagement. In a first example of the method, the predicting of at least one of the time of engine engagement and the driver requested torque at the engine engagement is based on a current position of an accelerator pedal and a driver profile. In a second example of the method, optionally including the first example, the method further comprises: controlling motor torque profile based on the reduced driver requested torque. In a third example of the method, optionally including one or both of the first and second examples, the reducing of the driver requested torque ramps up and then ramps down. In a fourth example of the method, optionally including one or more or each of the first through third examples, the driver profile is based on past driving behavior of a driver. In a fifth example of the method, optionally including one or more or each of the first through fourth examples, reducing the driver requested torque based on the predicted driver requested torque at the engine engagement does not end until the predicted time or after. In a sixth example of the method, optionally including one or more or each of the first through fifth examples, reducing the driver requested torque based on the predicted driver requested torque includes a percent reduction that ramps up and then down. In a seventh example of the method, optionally including one or more or each of the first through sixth examples, reducing the driver requested torque based on the predicted driver requested torque occurs only after the vehicle begins moving above a threshold non-zero positive speed, and only when the engine transitions from a stopped and unengaged condition to a combusting and engaged condition. In an eighth example of the method, optionally including one or more or each of the first through seventh examples, the engine is coupled through a disconnect clutch to the motor. In a ninth example of the method, optionally including one or more or each of the first through eighth examples, an output of the motor is coupled to a torque converter or launch clutch, the output of which is coupled through a transmission including a final drive to vehicle wheels. In a tenth example of the method, optionally including one or more or each of the first through ninth examples, reducing the driver requested torque until the predicted time of engine engagement based on the predicted driver requested torque at the engine engagement including reducing a current driver requested torque.

The disclosure also provides support for a system for a vehicle, comprising: an internal combustion engine, a disconnect clutch, an electric motor, the disconnect clutch coupled between the internal combustion engine and the electric motor, and a control system with instructions stored therein that when executed are for shaping a motor torque profile, including: during a vehicle launch and while an the engine transitions from an engine-off condition to a combusting and engaged condition, upon receiving an engine start request: predicting a time of engine engagement and reducing a driver requested torque with a ramped reduction that ends at the predicted time of engine engagement. In a first example of the system, the reducing of the driver requested torque is based on a prediction of driver requested torque at the engine engagement and a driver profile, wherein the driver profile is based on past driving behavior of a driver. In a second example of the system, optionally including the first example, reducing the driver requested torque includes a percent reduction that ramps up and then down.

The disclosure also provides support for a method for shaping a torque profile for a motor of a vehicle, the method comprising: during a vehicle launch, an condition of an engine, and upon receiving an engine start request, predicting a time of engine engagement, predicting a driver requested torque at the engine engagement, reducing the driver requested torque until the predicted time of engine engagement based on the predicted driver requested torque at the engine engagement, wherein the predicting of at least one of the time of engine engagement and the driver requested torque at the engine engagement is based on a current position of an accelerator pedal and a driver profile, and controlling motor torque based on the reduced driver requested torque, wherein the driver profile is based on past driving behavior of the driver. In a first example of the method, reducing the driver requested torque based on the predicted driver requested torque at the engine engagement does not end until the predicted time or after. In a second example of the method, optionally including the first example, reducing the driver requested torque based on the predicted driver requested torque includes a percent reduction that ramps up and then down. In a third example of the method, optionally including one or both of the first and second examples, reducing the driver requested torque based on the predicted driver requested torque occurs only after the vehicle begins moving above a threshold non-zero positive speed, and only when the engine transitions from a stopped and unengaged condition to a combusting and engaged condition. In a fourth example of the method, optionally including one or more or each of the first through third examples, the engine is coupled through a disconnect clutch to the motor. In a fifth example of the method, optionally including one or more or each of the first through fourth examples, an output of the motor is coupled to a torque converter or launch clutch, the output of which is coupled through a transmission including a final drive to vehicle wheels.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations, and/or functions may be repeatedly performed depending on the particular strategy being used. Further, the described actions, operations, and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. Moreover, unless explicitly stated to the contrary, the terms "first," "second," "third," and the like are not intended to denote any order, position, quantity, or importance, but rather are used merely as labels to distinguish one element from another. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for shaping a torque profile for a motor of a vehicle, the method comprising:
   during a vehicle launch, an off condition of an engine, and upon receiving an engine start request,
   predicting a time of engine engagement;
   predicting a driver requested torque at the engine engagement; and
   reducing a response of the motor to the driver requested torque until the predicted time of engine engagement based on the predicted driver requested torque at the engine engagement to shape the torque profile, wherein reducing the response of the motor to the driver requested torque based on the predicted driver requested torque at the engine engagement includes a percent reduction that ramps up and then down.

2. The method of claim 1, wherein the predicting of at least one of the time of engine engagement and the driver requested torque at the engine engagement is based on a current position of an accelerator pedal and a driver profile.

3. The method of claim 2, wherein the driver profile is based on past driving behavior of a driver.

4. The method of claim 1, wherein reducing the response of the motor to the driver requested torque based on the predicted driver requested torque at the engine engagement does not end until the predicted time or after.

5. The method of claim 1, wherein reducing the driver requested torque based on the predicted driver requested torque at the engine engagement occurs only after the vehicle begins moving above a threshold non-zero positive speed, and only when the engine transitions from a stopped and unengaged condition to a combusting and engaged condition.

6. The method of claim 5, wherein the engine is coupled through a disconnect clutch to the motor.

7. The method of claim 6, wherein an output of the motor is coupled to a torque converter or launch clutch, the output of which is coupled through a transmission including a final drive to vehicle wheels.

8. The method of claim 1, wherein reducing the driver requested torque until the predicted time of engine engagement based on the predicted driver requested torque at the engine engagement includes reducing a current driver requested torque.

9. The method of claim 1, further comprising determining a driving style of a driver, wherein reducing the response of the motor to the driver requested torque is further based on the driving style of the driver.

10. The method of claim 9, wherein the driving style of the driver is classified as either aggressive or normal.

* * * * *